US010337630B2

(12) United States Patent
Apadula et al.

(10) Patent No.: US 10,337,630 B2
(45) Date of Patent: Jul. 2, 2019

(54) OIL-HYDRAULIC VALVE

(71) Applicant: S. T. S. R. L., Calderara di Reno (IT)

(72) Inventors: Graziano Apadula, Bologna (IT); Graziantonio Apadula, Bologna (IT); Rocco Garcea, Bologna (IT)

(73) Assignee: S.T. S.R.L., Calderara di Reno (IT)

( * ) Notice: Subject to any disclaimer, the term of this patent is extended or adjusted under 35 U.S.C. 154(b) by 0 days.

(21) Appl. No.: 14/351,389

(22) PCT Filed: Oct. 17, 2012

(86) PCT No.: PCT/IB2012/055650
§ 371 (c)(1),
(2) Date: Apr. 11, 2014

(87) PCT Pub. No.: WO2013/057667
PCT Pub. Date: Apr. 25, 2013

(65) Prior Publication Data
US 2014/0251464 A1 Sep. 11, 2014

(30) Foreign Application Priority Data
Oct. 21, 2011 (IT) .............................. BO2011A0599

(51) Int. Cl.
*F15B 13/02* (2006.01)
*F16K 17/04* (2006.01)
(52) U.S. Cl.
CPC .......... *F16K 17/044* (2013.01); *F15B 13/024* (2013.01); *F16K 17/04* (2013.01); *Y10T 137/7924* (2015.04); *Y10T 137/7932* (2015.04)
(58) Field of Classification Search
CPC ...... F16K 17/044; F16K 17/04; F15B 13/024; F15B 13/026; Y10T 137/7924; Y10T 137/7932; Y10T 137/7841
See application file for complete search history.

(56) References Cited

U.S. PATENT DOCUMENTS

| | | | | |
|---|---|---|---|---|
| 1,229,885 A | * | 6/1917 | Chadwick | ............. F16K 17/196 |
| | | | | 137/493.4 |
| 2,393,589 A | * | 1/1946 | Compton | ................ F16K 17/18 |
| | | | | 137/493.4 |

(Continued)

FOREIGN PATENT DOCUMENTS

| | | |
|---|---|---|
| CN | 1795327 A | 6/2006 |
| DE | 10346211 A1 | 9/2004 |

(Continued)

*Primary Examiner* — Marina A Tietjen
*Assistant Examiner* — Frederick D Soski
(74) *Attorney, Agent, or Firm* — Pearne & Gordon LLP (57) ABSTRACT

A pressure limiting valve (1), operationally arranged between a high pressure zone and low pressure zone (HP, LP) of a hydraulic circuit, comprises: a valve body (4) defining a passage (11) for a fluid; a closing member (8) having a stem (10) and a closing head (9) connected thereto and movably engaged with the valve body (4) so as to move along a longitudinal or axial direction (X) between positions (P1, P2) for closing and opening the passage (11), in an opening direction (OD) and closing direction (CD), respectively; a sleeve (12) which is joined to the stem (10); a spring (S1) arranged between the sleeve (12) and the valve body (4) so as to exert a force on the closing member (8) along said longitudinal or axial direction (X), in the closing direction (CD); said sleeve (12) is irreversibly locked to the stem (10) by means of a threadless mechanical connection, in a predefined longitudinal or axial position of the said stem (10), so that the spring (S1) exerts a force of predefined value on the closing member (8) arranged in the closed position (P).

16 Claims, 8 Drawing Sheets

(56) References Cited

U.S. PATENT DOCUMENTS

| | | | |
|---|---|---|---|
| 2,834,374 A | 5/1958 | Klinkenberg | |
| 3,112,763 A * | 12/1963 | Tennis | F16K 17/18 137/493.5 |
| 3,228,419 A | 1/1966 | Smith et al. | |
| 3,604,450 A * | 9/1971 | Botkin | F16K 17/18 137/493.4 |
| 4,210,170 A * | 7/1980 | Sutton | E02F 9/226 137/493.4 |
| 4,300,591 A * | 11/1981 | Sutton | E02F 9/226 137/493.4 |
| 6,691,512 B1 * | 2/2004 | Kobel | F16D 31/02 60/468 |
| 6,923,202 B2 | 8/2005 | Emerson | |
| 6,964,280 B1 * | 11/2005 | Trimble | F16K 15/063 137/454.5 |
| 6,986,363 B1 * | 1/2006 | Trimble | F16K 17/044 137/493.6 |
| 7,066,199 B1 * | 6/2006 | Trimble | F16K 17/196 137/493.5 |
| 7,320,334 B1 * | 1/2008 | Trimble | F15B 11/0445 137/493.1 |
| 7,392,823 B2 * | 7/2008 | Dong | F16K 17/26 137/493.6 |
| 8,302,621 B2 * | 11/2012 | Schniederjan | F16K 17/044 137/493.3 |
| 2004/0261848 A1 | 12/2004 | Kayukawa | |
| 2005/0211308 A1 * | 9/2005 | Thoms | F15B 13/024 137/514.5 |
| 2005/0264100 A1 | 12/2005 | Enerson | |
| 2006/0039811 A1 | 2/2006 | Nieslony et al. | |
| 2008/0210313 A1 * | 9/2008 | Schniederjan | F16K 17/044 137/535 |
| 2009/0301584 A1 | 12/2009 | McKee | |

FOREIGN PATENT DOCUMENTS

| | | |
|---|---|---|
| JP | 08 219598 A | 8/1996 |
| JP | 2005528567 A | 2/2005 |
| WO | 2006/069692 A1 | 7/2006 |

* cited by examiner

OIL-HYDRAULIC VALVE

TECHNICAL FIELD

The present invention relates to a pressure limiting valve.

In particular, such a valve is an oil-hydraulic valve defining a device for limiting dangerous overpressures in pipes or in oil-hydraulic systems.

In particular, the present invention relates to a valve able to limit, in a hydraulic circuit, the maximum pressure (so-called "anti-shock" function). In other words this limiting valve prevents a predefined overpressure value from being exceeded in the hydraulic circuit in which it is inserted.

BACKGROUND ART

Pressure limiting oil-hydraulic valves which can be inserted in a hydraulic circuit in order to separate (or sealingly isolate) a high pressure portion (or zone) of the hydraulic circuit from a low pressure portion (or zone) of the hydraulic circuit are already known, e.g. from patent documents per WO2006/069692, US2006/039811 and US2005/264100.

These valves are inserted inside a receiving seat.

These valves comprise a valve body and a closing body (or closing member) which are arranged inside the receiving seat.

In particular the closing member is slidable with respect to the valve body along a first direction of longitudinal—or axial—extension, between a closed position in which the closing member bears against an associated seat of the valve body and an open position in which the closing body does not bear against the aforementioned seat and a fluid through-flow region is defined between stem and valve body.

The valve body has, formed therein, a central hole which defines the fluid through-flow region; the said valve body may have a guide for the stem of the closing member, which allows axial displacements of the latter.

The closing member comprises a substantially conical or spherical portion—or head—mating with the valve body and a stem with an elongated form extending from this head.

The stem of the closing body is provided with a threaded portion which is remote from the head.

The valve further comprises a sleeve for centring/guiding and locking the stem, which is slidable with respect to the walls of the seat receiving the said valve.

The centring/locking sleeve is provided with a threaded hole inside which the stem is screwed and locked.

This valve also comprises a spring extending longitudinally or axially along the first direction.

It should be noted that the spring is arranged between the sleeve and the valve body.

This valve normally isolates a high pressure region of the oil-hydraulic circuit from a low pressure region (closing member in closed position) and is designed to connect the high pressure region to the low pressure region (closing member in open position) if the relative pressure between the high pressure duct and the low pressure duct is greater than a predetermined operating pressure value of the valve (usually corresponding to an overpressure or shock condition in the high pressure circuit).

It should be noted that the prestress of the spring (compression of the spring when there is no pressure difference between high pressure region and low pressure region) determines the value of the operating pressure (value of the pressure difference between high pressure region and low pressure region).

Therefore, in this valve, correct adjustment of the prestress of the spring (so-called valve calibration) is of fundamental importance in order for the closing body to be moved from the closed position into the open position when there is a predefined pressure difference between high pressure region and low pressure region, corresponding to the desired operating pressure.

It should be noted that this prestress coincides with the resilient force developed by the spring when compressed to the first working length, usually predefined by the surrounding conditions for each valve size. According to the prior art, valve calibration is performed in situ, namely by connecting the valve to a "test" circuit between a high pressure zone and a low pressure zone.

This calibration method envisages screwing the sleeve onto the stem in a predefined position, inserting it inside the seat and applying a predetermined relative pressure between the high pressure circuit and low pressure circuit corresponding to the desired operating pressure value.

This calibration method is repeated until the closing member establishes communication between the two—high pressure and low pressure—zones at the set (required) pressure difference value between the two—high pressure and low pressure—regions.

Therefore, hitherto, with this calibration method, ensuring a high degree of precision for the valve calibration is particularly time-consuming.

In addition, a valve thus designed is relatively complex and requires long assembly times.

A further drawback encountered in this type of valve is that it does not guarantee a high degree of reliability or a high operating stability; in fact, this valve is unable to ensure over time that opening of the valve occurs at the operating value for which the valve has been calibrated (using the method described above).

This problem is partly solved by adopting additional locking systems for preventing unscrewing of the threaded pair, although this further complicates the structure and assembly of the valve.

This drawback is particularly critical in the applications where the opening precision is an essential requirement.

DISCLOSURE OF THE INVENTION

The object of the present invention is to provide an (oil-hydraulic) pressure limiting valve which overcomes the drawbacks of the prior art mentioned above.

In particular, the object of the present invention is to provide an (oil hydraulic) pressure limiting valve which is simple, low-cost, highly reliable and stable and a method for manufacturing said valve.

Said objects are fully achieved by the pressure limiting valve (and by the method for manufacturing said valve) according to the present invention, which is characterized by the contents of the claims indicated below.

In particular, the pressure limiting valve according to the invention can be inserted in a seat of a hydraulic circuit arranged between a high pressure zone and a low pressure zone and comprises: a valve body designed to engage sealingly with the walls of said seat and defining internally a fluid through-passage; a closing member having a stem and a closing head connected to a first end of the stem and movably engaged with the valve body so as to move along a longitudinal or axial direction of extension of the stem from a position for closing the passage, where the head is sealingly engaged with the valve body, into a position for opening the passage, and vice versa, in an opening direction and closing direction, respectively; a sleeve joined to said stem of the closing member at a second end thereof; a spring arranged between the sleeve and the valve body and designed to exert a force on said closing member along said longitudinal or axial direction, in the closing direction.

According to the invention, said sleeve is irreversibly locked to said stem by means of a threadless mechanical connection, in a predefined longitudinal (or axial) position of the said stem, so that the spring exerts on the closing member a force of predefined value when the closing member is in the closed position.

Preferably, the mechanical connection between the sleeve and the stem is a connection suitable for being carried out dynamically in an arbitrary position (i.e. in a position which is not predetermined, contrarily to the case of the threaded coupling) of the stem; for example, said mechanical connection between the sleeve and the stem comprises plastic deformation, or a bi-cone (that is, a conical coupling), or a laser welding. "Initial working length Li" is defined as the length of the spring when the closing member is in the closed position.

The method for manufacturing a pressure limiting valve according to the invention comprises the following steps: providing a valve body defining internally a passage for a fluid and designed to engage sealingly with a seat of a hydraulic circuit arranged between a high pressure zone and a low pressure zone; providing a closing member comprising a stem and a closing head connected to a first end of the stem; joining the closing member to the valve body so that the closing member is movable along a longitudinal or axial direction of extension of the stem from a position for closing the passage, where the head is sealingly engaged with the valve body, into a position for opening the passage, and vice versa, in an opening direction and closing direction, respectively; providing a sleeve and a spring arranged between the sleeve and the valve body so that it (the spring) exerts a force on said closing member along said longitudinal or axial direction, in the closing direction; joining the sleeve to the stem of the closing member at a second end thereof.

In particular, it should be noted that the stem defines a predefined portion (at said second end) prepared (by means of suitable mechanical machining or measures for improving the grip) for joining to the sleeve. According to the invention, this method comprises a step for compressing the spring between the sleeve and the valve body, to a compression corresponding to a predefined force value, and envisages that said joining of the sleeve to the stem is performed with irreversible locking, by means of a threadless mechanical connection, in a longitudinal (or axial) position of the stem.

Preferably, the mechanical connection between the sleeve and the stem is carried out dynamically in an arbitrary position (i.e. in a position which is not predetermined, contrarily to in the case of the threaded coupling) of the stem; for example, said mechanical connection between the sleeve and the stem is performed through a plastic deformation, or the use of a bi-cone (that is, a conical coupling), or through laser welding.

Preferably, the sleeve (and optionally other components of the valve) have dimensions such that, when the sleeve is fixed to the stem in said longitudinal position, the spring has the predefined length (corresponding to the predetermined force value) and, at the same time, the sleeve is connected to the stem in a predefined zone (designed so as to be particularly suitable for connection to the sleeve).

In other words, the method envisages the following steps: a) a step involving compression of the spring between the sleeve and the valve body until both the predefined force and the axial position necessary for mating of certain valve components during the forced opening of the closing member in the non-destructive test of the locking joint are reached, so as to ensure simultaneously maximum opening of the valve during operation thereof, while keeping in both the conditions and positions of the closing member the maximum tension of the spring S1 at a value less than the permissible breaking strength/yield point of the material;
b) a step in which the sleeve and the stem are locked together in an irreversible manner by means of a threadless mechanical connection, in an axial position of the stem such as to satisfy the aforementioned conditions.

Furthermore it should be noted that the invention envisages providing a series of valve bodies which are designed to engage sealingly with the suitable seat of a hydraulic circuit arranged between a high pressure zone and a low pressure zone, as well as a stem guide of suitable dimensions. It is envisaged moreover providing one or more closing members with the same overall length, comprising a stem and a closing head which is preferably spherical or conical and connected to a first end of the stem. Moreover it is envisaged joining the closing member to the valve body so that the closing member is movable along the axial direction of the stem, from a position for closing the passage, where the head is sealingly engaged with the valve body, into a position for opening the passage, during operation, and vice versa, in an opening direction and closing direction, respectively; and providing a series of sleeves with suitable dimensions for the various calibration and surrounding conditions.

"Valve category/size" is understood as meaning the set of valves suitable for operating at a predefined maximum flowrate of a fluid (oil).

In this connection it is envisaged providing, for each valve category/size according to the invention, a series of springs which, when compressed between the sleeve and the valve body arranged in the predetermined position of the components for assembly and locking, exert on the closing member an axial force, in the closing direction, equal to a corresponding operating force (corresponding to the desired calibration pressure.

Each of the springs of this series of springs (provided for a predefined valve category) is preferably designed to satisfy the following technical specifications:
- bedding-in of the spring to a length smaller than its length in the fully open operating position, but greater than the permitted minimum length (minimum space between turns);
- torsional tension during bedding-in less than the maximum tension of the spring material permissible for this operation;
- guaranteed fully open operating condition of the valve with maximum safety of spring strength.

Moreover, it is envisaged performing threadless mechanical locking of the sleeve onto the stem of the closing member at the end thereof opposite to the head.

BRIEF DESCRIPTION OF DRAWINGS

This characteristic feature, together with others, will emerge more clearly from the following description of a preferred embodiment illustrated purely by way of a non-limiting example in the accompanying sets of drawings in which:

FIGS. 3a, 3b, 3c; 4a, 4b, 4c; 5a, 5b, 5c show respective side, plan and cross-sectional views of different embodiments of a detail of the valve according to FIGS. 1 and 2;

DETAILED DESCRIPTION OF PREFERRED EMBODIMENTS OF THE INVENTION

The reference number 1 denotes a pressure limiting valve for oil-hydraulic circuits according to the present invention.

Figure 1:
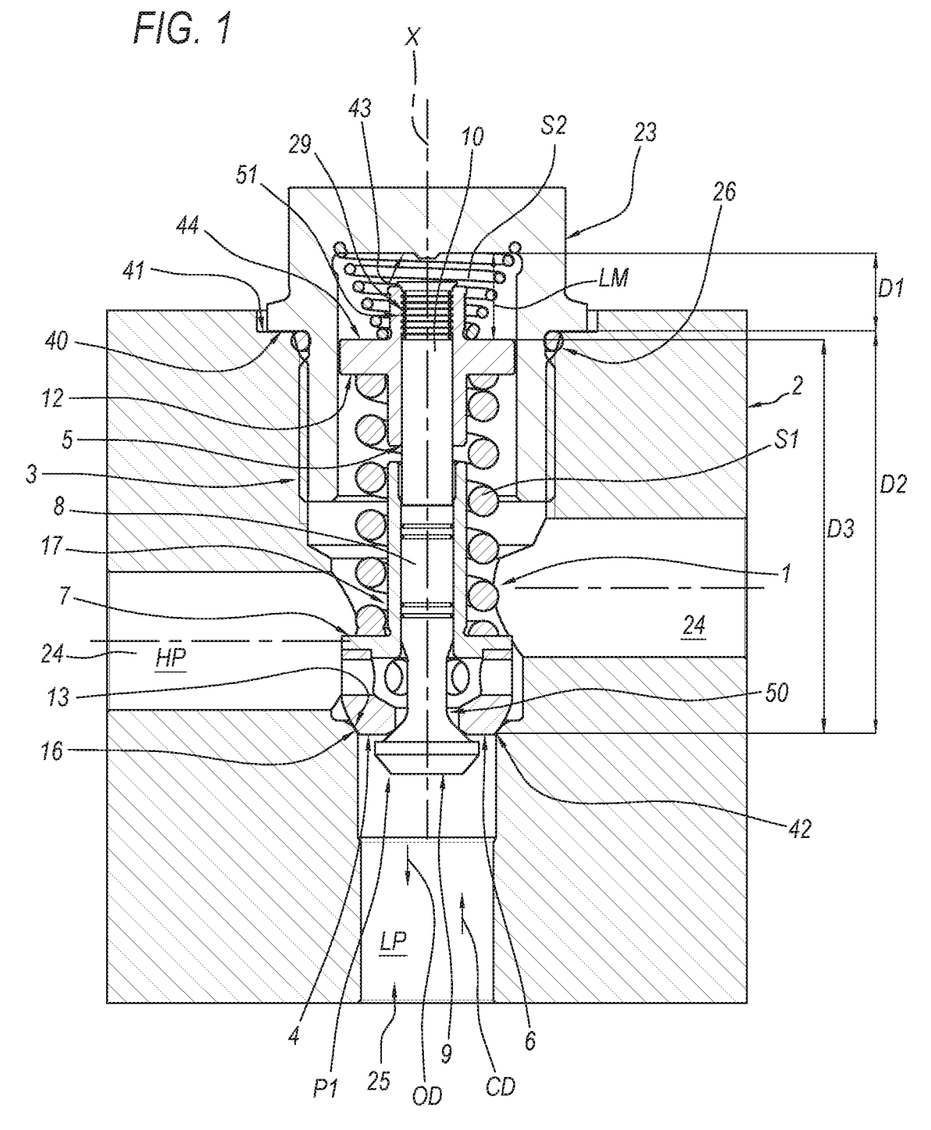
FIG. 1 shows a cross-sectional view of a preferred embodiment of the valve according to the invention in a closed configuration.
Figure 2:
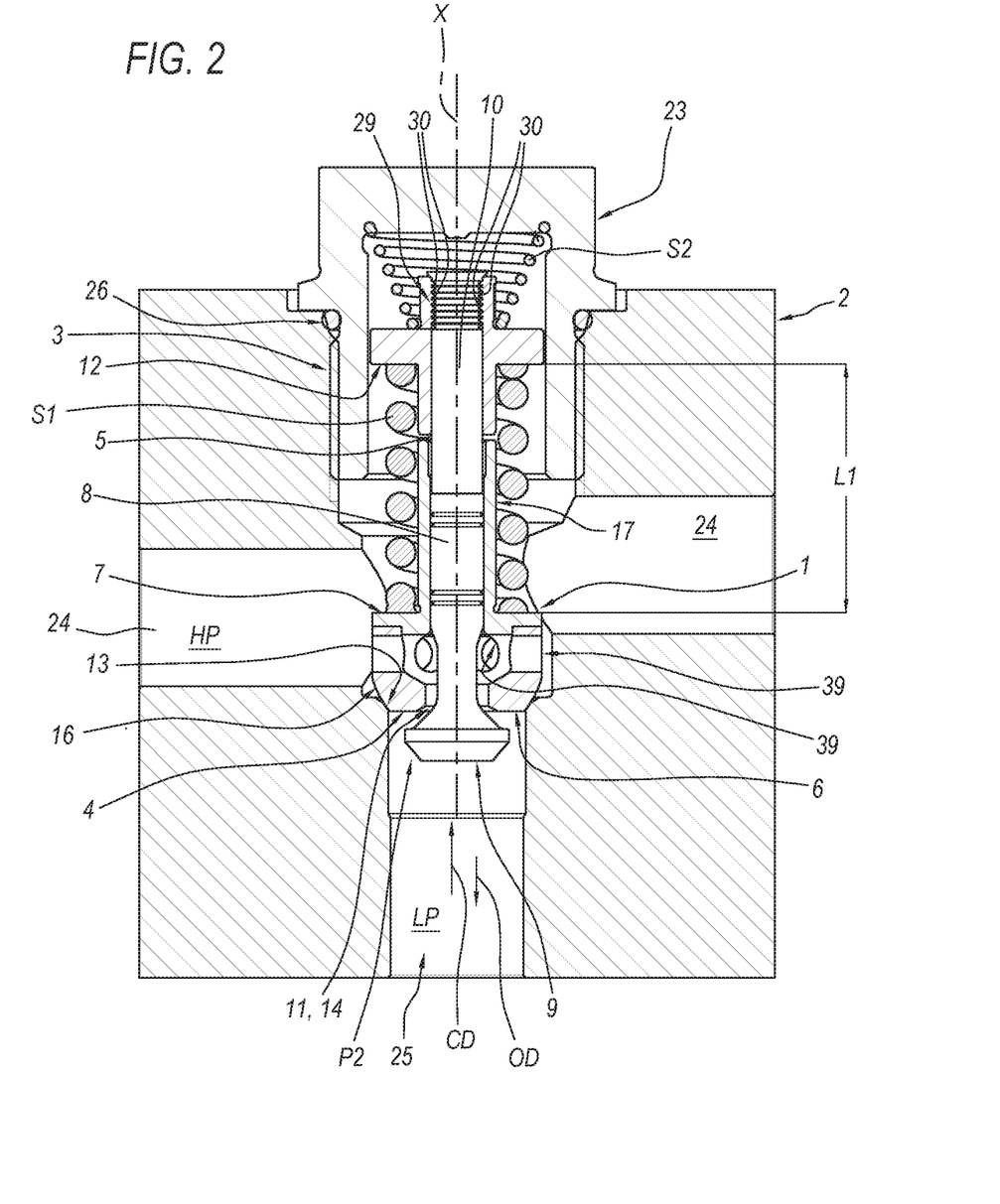
FIG. 2 shows a cross-sectional view of a preferred embodiment of the valve according to the invention in an open configuration.

This valve 1, in FIGS. 1 and 2, is arranged in an oil-hydraulic circuit.

In particular, the valve 1 is arranged between a high pressure zone HP and a low pressure zone LP.

Normally (i.e. during normal operation of the hydraulic circuit) the pressure in the high pressure zone HP is greater than the pressure in the low pressure zone LP.

FIG. 1 shows a containing body 2 of the valve 1 showing the two zones, i.e. high pressure zone HP and low pressure zone LP.

The containing body 2 has, formed therein, a seat 3 for receiving the valve 1.

The valve 1 (or the components of the valve 1 which will be introduced and described more fully below) are arranged inside the seat 3 of the containing body 2.

It should be noted (see FIG. 1) that the containing body 2 has, internally, a duct 24 defining the high pressure zone HP and a duct 25 defining the low pressure zone LP.

In this connection it should be noted that the seat 3 is formed in the region where the duct 24 of the containing body 2 is connected to the duct 25 of the containing body 2.

This seat 3 is closed at the top by a closing cap 23.

In this connection it should be noted that the closing cap 23 is removably fixed to the containing body 2 (preferably screwed into it) so as to allow insertion or removal of the valve 1 from the containing body 2.

Preferably the cap 23 has the form of an overturned cup.

A seal 26 is arranged between the cap 23 and the containing body 2 for performing sealed closure of the seat 3.

The components of the valve 1 according to the invention which are arranged inside the seat 3 will be described below.

These components will be described with reference to an assembled configuration of the valve 1 (or with reference to an operating configuration of the valve 1) as shown in FIG. 1.

The valve 1 comprises a valve body 4 and a closing member 8.

According to the invention, the valve body 4 is designed to engage sealingly with the walls of said seat 3 and defines internally a passage 11 for a fluid between the two—high pressure and low pressure—zones (HP, LP).

It should be noted that the seat 3 has, formed therein, a conical sealing surface defining a tapered zone 13; the closing member 8 engages sealingly with the walls of this conical sealing surface (or tapered zone) 13. Preferably and in a non-limiting manner the valve body 4 comprises two parts which can be joined together, i.e. a first part 16 and a second part 17.

The first part 16 is designed so as to mate with the walls of the seat 3 and form a seal against these walls.

It should be noted that this first element 16 has a central hole 11 defining a seat 14 against which the closing member 8 bears (as will be described more fully below) so as to allow closing of the through-passage defined by the said hole 11.

Moreover this first part 16 comprises peripheral holes 39 for the through-flow of the fluid.

These holes 39 are arranged radially around the valve axis.

It can be seen from FIG. 1 that, during use, a first surface 6 (bottom surface with reference to FIG. 1) of the first part 16 is in contact with the low pressure fluid LP, while a second portion 7 (top portion with reference to FIG. 1) of the first part 16 is in contact with the high pressure fluid HP. The second part 17 has a (tubular) hollow cylindrical portion 31 and a flange-shaped portion 32.

It should be noted that the tubular portion 31 of the second part 17 has, formed therein, a longitudinal or axial through-hole 35 for receiving the stem 10.

When the two parts 16, 17 are joined together a bottom opening of the hole 35 faces a top opening of the hole 11.

It should be noted that the second part 17 is designed to guide the stem 10 during its movement in the opening direction OD/closing direction CD. It should be noted that the flanged portion 32 of the second part 17 is formed so as to engage with the first part 16; in particular it should be noted that the first part 16 has (situated above with reference to FIG. 1) a seat 52 for centring the flanged portion 32, shaped so as to allow centring of the flanged portion 32 or the second part 17 with respect to the first part 16.

Figure 6:
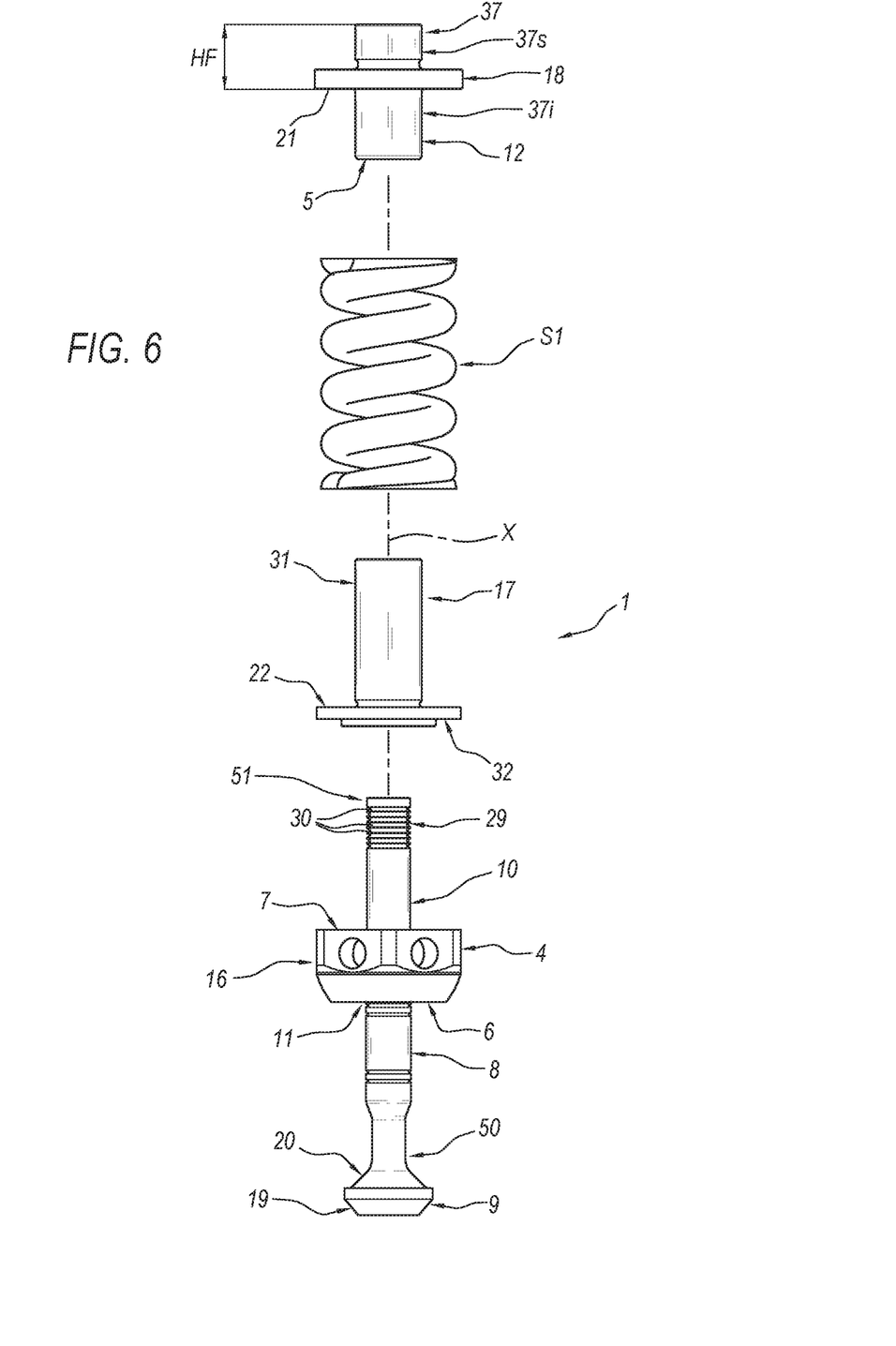
FIG. 6 shows a schematic view of the valve according to FIGS. 1 to 2.
Figure 7:
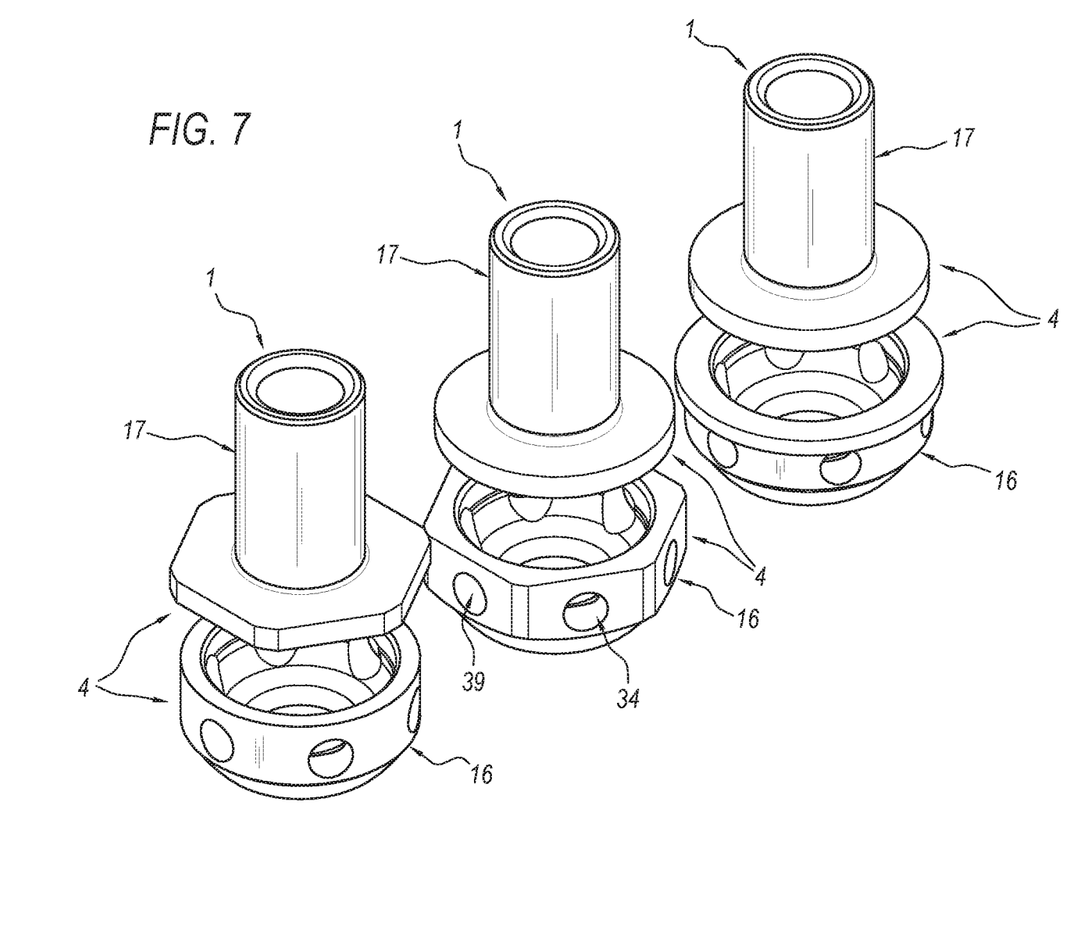
FIG. 7 shows a schematic perspective view of different embodiments of a detail of the valve according to FIGS. 1 and 2.
Figure 7A:
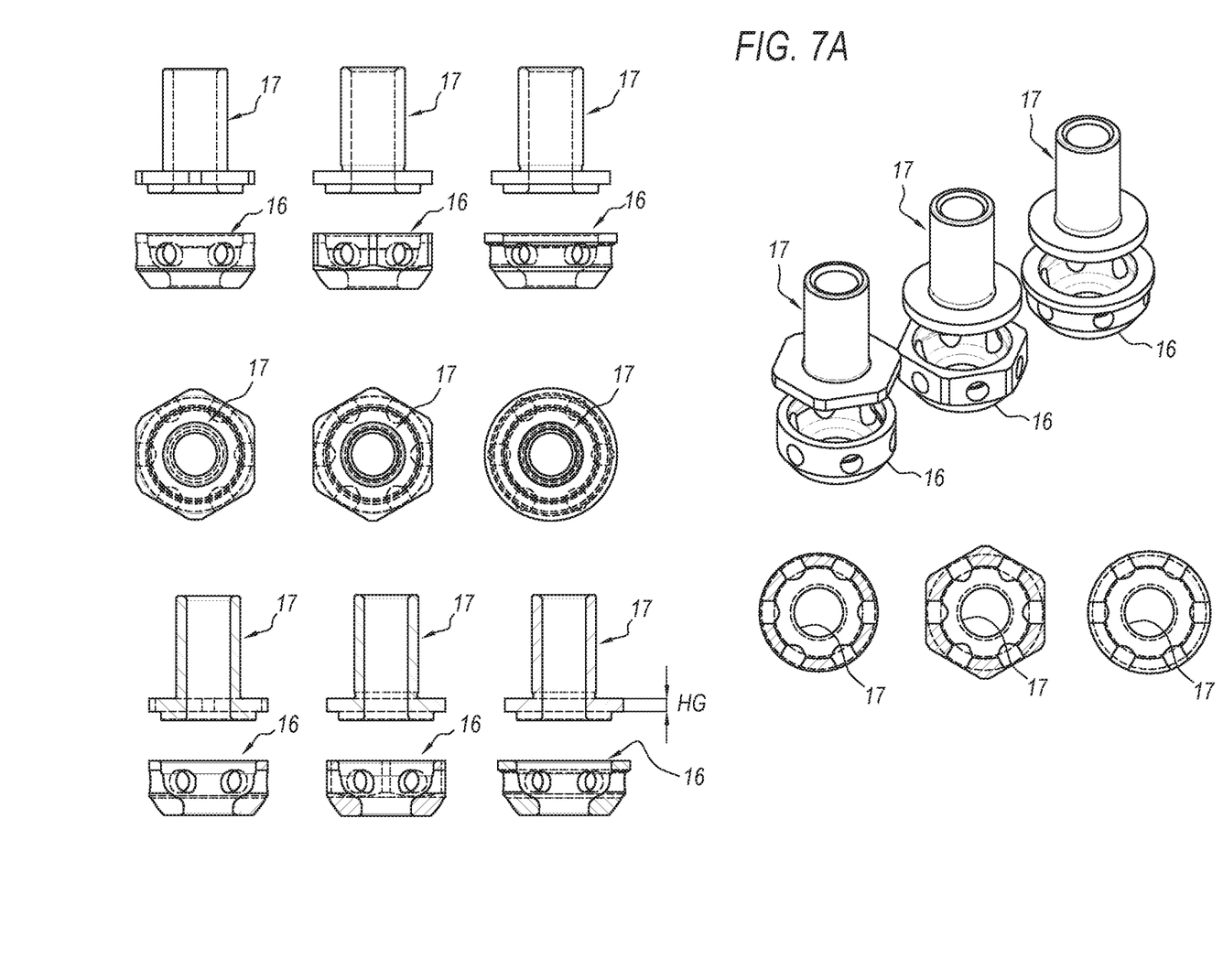
FIGS. 7A and 7B each show various views of three embodiments of details of the valve according to the invention.
Figure 7B:
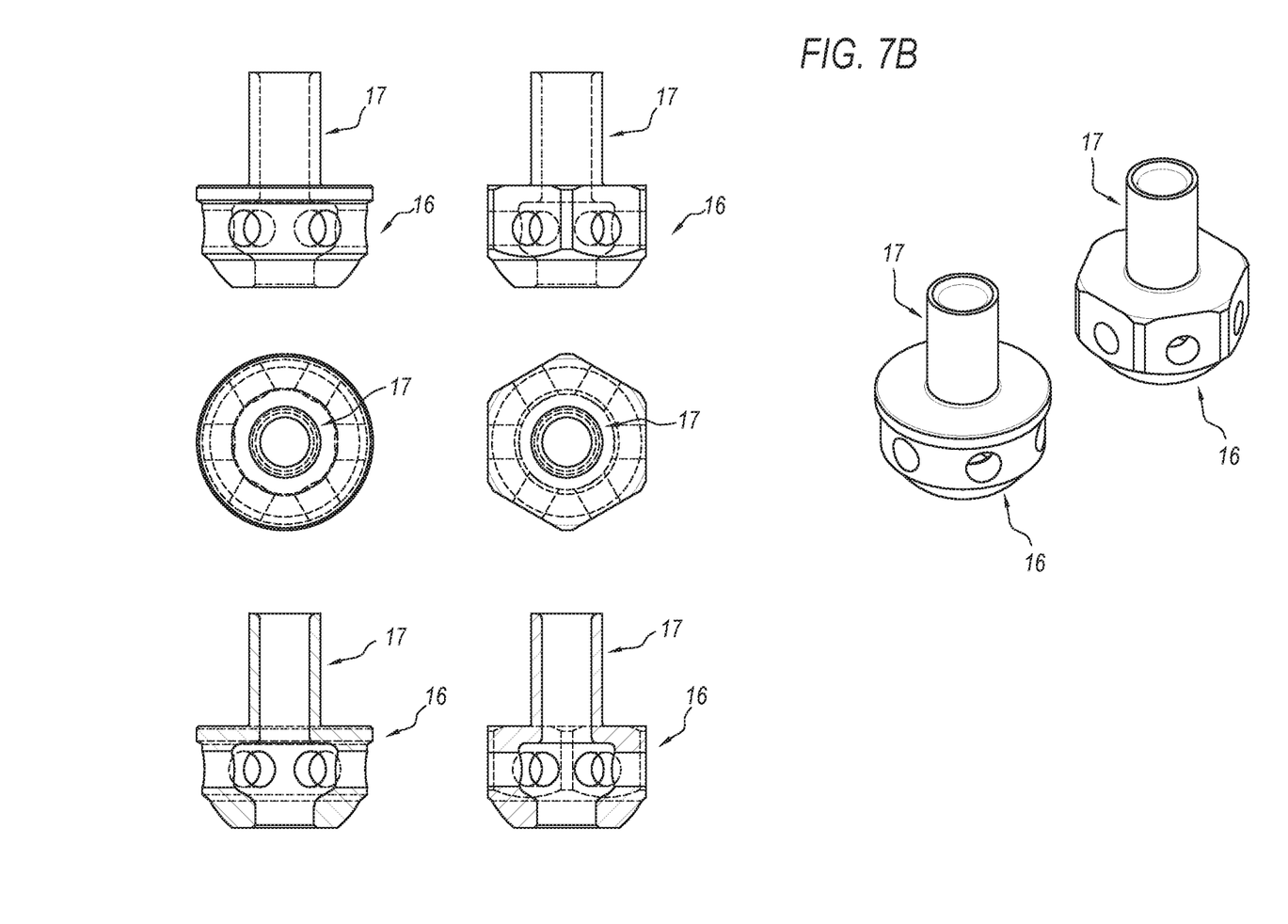

FIGS. 3, 4 and 6 show different embodiments of the valve body 4.

Figures 3A, 3B, 3C, 4A, 4B, 4C, 5A, 5B, 5C:
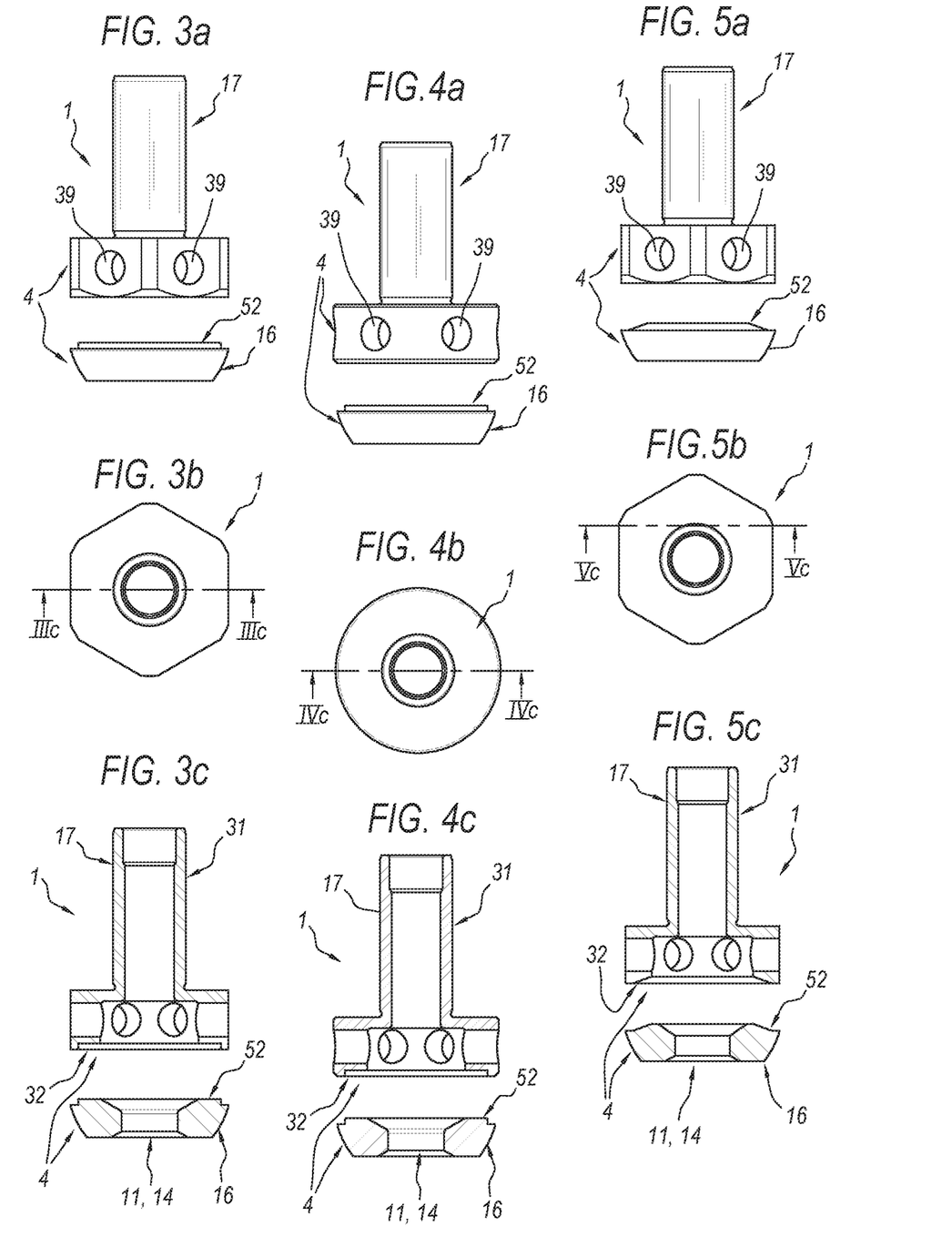

In particular, it should be noted that the first part 16 comprises a portion 52 for centring the second part 17, which may have a cylindrical form (as shown in FIGS. 3a, 3b, 3c, 4a, 4b, 4c) or conical form (as shown in FIG. 4).

The second part 17 is preferably removably engaged with the first part 16.

The closing member 8 will be described below.

The closing member 8 comprises a closing head 9 and a stem 10 connected to the closing head 9.

The closing head 9 is arranged at a first end 50 of the stem 10.

Preferably the stem 10 and the closing head 9 are formed as one piece.

The closing member 8 is movable with respect to the valve body 4 along a longitudinal or axial direction X of extension of the stem 10 between an open position P2 (shown in FIG. 2) and a closed position P1 (shown in FIG. 1).

In particular it should be noted that the closing member 8 is movable from the closed position P1 into the open position P2 along an opening direction (indicated by the reference OD) and from the open position P2 into the closed position P1 along a closing direction (indicated by the reference CD), opposite to the opening direction.

In this connection it should be noted that FIG. 1 shows the closed position P1 of the closing member, where the head 9 of the closing member 8 bears against the walls of the central hole (FIG. 1) of the first part 16 of the valve body 4; in this closed position P1 the passage of the fluid from the high pressure circuit HP to the low pressure circuit LP is prevented.

It should be noted that the closing member 8 is slidably associated with the valve body 4 (in particular the part 17).

In particular the constant diameter portion of the closing member 8 is associated in sliding engagement with the valve body 4 (part 17).

In the valve the overall length of the closing member 8 is determined so as to reach the predetermined prestress of the spring S1 in the specific axial locked position of the sleeve 12 on the stem 8.

It should be noted that this also allows precise calibration without the need for further operations of the anti-cavitation function (as will be described more fully below): in fact the anti-cavitation spring S2 (shown in FIGS. 1 and 2 and more fully described below) is set automatically to the desired prestress, which does not happen in the prior art where calibration of the anti-cavitation spring must be obtained by means of additional operations. The closing head 9 is in contact with the fluid of the high pressure circuit HP and with the fluid of the low pressure circuit LP.

By way of a non-limiting example, in accordance with that shown in FIG. 1, the closing head 9 comprises an enlarged portion 19 (remote from the valve body 4) and a shaped portion 20 (which is preferably conical or spherical).

It should be noted that the shaped portion 20 is formed so as to engage sealingly with the walls of the central hole 11 (as shown in FIG. 1) when the closing member 8 is in the closed position P1.

According to the example shown in FIG. 1, the closing head 9 protrudes from the central hole 11 of the valve body 4 in the direction of the low pressure zone LP (with reference to FIG. 1).

In particular, it should be noted that closing head 9 projects outside of the valve body 4.

In particular, it should be noted that, when the closing member 8 is in the closed position, the enlarged portion 19 of the closing head 9, in the example shown in FIG. 1, is in contact with the fluid under low pressure LP; on the other hand, the shaped portion 20 makes sealing contact with the walls of the seat 14 and separates the fluid under high pressure HP from the fluid under low pressure LP.

It should be noted that both the pressure of the fluid under low pressure LP and the pressure of the fluid under high pressure HP act on the head 9 of the closing member 8.

Moreover the head 9 has, preferably, a geometrical form suitable for minimizing the dynamic flow forces which are generated during operation with the valve open.

The stem 10 of the closing member 8 has, preferably, a cylindrical form.

It can be seen from FIG. 1 that the stem 10, during use, is arranged slidably inside the through-hole 35 of the second part 17 of the valve body 4.

In this connection, it should be noted that the second part 17 of the valve body 4 allows the stem 10 to be guided.

According to the invention, the valve 1 further comprises a sleeve 12.

During use the sleeve 12 is fixed to (or locked with respect to) the stem 10 of the closing member 8 by means of a threadless connection, as will be described more fully below.

The sleeve 12 comprises a tubular portion 37 and a portion 18 (below also called flange) protruding radially from the tubular portion 37.

It should be noted that the flange 18, in the example shown, has a circular form in plan view and has a radius greater than that of the tubular portion 37.

It should be noted the radially protruding portion 18 is arranged in a central position of the tubular portion 37 (in this connection the tubular portion may therefore be divided into an upper hollow tubular or cylindrical portion 37S and a lower hollow tubular or cylindrical portion 37*l*).

The radially protruding portion 18 (flange) is preferably designed so as to be centred relative to the side walls of the seat 3 and/or the cap.

The sleeve 12 is preferably, but not exclusively, formed as one piece.

It should be noted that the sleeve 12, in particular the tubular portion 37, has an axially extending through-hole 5 formed therein.

The stem 10 of the closing member 8, as shown in FIG. 1, is designed so that it may be inserted inside said through-hole 5 of the sleeve 12.

In particular, the sleeve 12 is joined to said stem 10 of the closing member 8 at a second end 51 of the said stem 10, opposite to the first end 50.

According to the invention, the valve 1 comprises a spring S1 arranged between the sleeve 12 and the valve body 4.

The spring S1 is designed to exert a force on the sleeve 12 (and consequently on the closing member 8 to which the sleeve 12 is fixed) along the closing direction CD.

Moreover, it should be noted that preferably the spring S1, which is arranged between the sleeve 12 and the valve body 4, is designed for all the calibration settings of the same valve category, so as to satisfy the following conditions:

the spring exerts, when compressed to the initial working length Li, on the sleeve 12 and on the closing member 8 (to which the sleeve 12 is fixed), the axial force corresponding to the operating pressure of the valve (also called calibration pressure);

said initial working pressure of the spring S1 coincides with the length thereof when the valve components are in the position envisaged for permanent locking of the sleeve 12 to the stem 10 of the closing member 8;

the spring may be bedded-in ("bedding-in" is understood as meaning a conditioning procedure performed by means of mechanical cycles for "slackening" the spring, as per a practice known in the sector) to a length smaller than its length in the fully open operating position, but greater than the necessary minimum length for ensuring its structural and functional integrity (for example ensuring that the space between the turns is not eliminated);

during bedding-in the torsional tension is less than the maximum tension of the spring material permissible during this operation;

possibility of achieving the fully open operating condition of the valve with maximum safety of valve strength and functionality.

It should be noted that, during use, the spring S1 is arranged outside the hollow tubular or cylindrical portion 31 of the second part 17 and the lower hollow tubular or cylindrical portion 37*l* of the sleeve 12.

It should be noted that the second part 17 (in particular the hollow tubular or cylindrical portion of the second part 17) performs the function of centring the spring S1.

It should be noted that this spring S1 bears against a lower surface 21 of the radially protruding portion or flange 18 of the sleeve 12 and against an upper surface 22 of the flange-shaped portion 32 of the second part 17.

It should be noted that the spring S1 opposes opening of the valve 1 (namely opposes displacement of the closing member 8 from the closed position P1 into the open position P2), exerting a force in the closing direction CD of the closing member 8.

With reference to the example illustrated, the spring S1 operates under compression during the entire stroke of the closing member 8, namely the spring S1 is compressed both when the closing member 8 is arranged in the closed position P1 and when the closing member 8 is arranged in the open position P2.

Certain aspects relating to the components of the valve 1 previously mentioned will be described more fully below.

It should be noted that the following forces act on the closing member 8 (in particular on the head 9 of the closing member 8):

the resilient force of the spring S1;
the force exerted by the high pressure fluid HP;
the force exerted by the low pressure fluid HP;
the dynamic flow forces during operation of the valve in the open position.

According to another aspect of the invention, the sleeve 12 and the valve body 4 are formed so as to define a fully open position of the closing member and maximum compression position of the spring S1, where the spring is not yet in a totally compressed condition (beyond which the spring cannot be compressed and is irreversibly deformed); in particular, sleeve and valve body are formed so that, in said fully open position, they mate or make contact; this could occur for example during particularly wide opening of the closing member 8 (for example in the case of forced opening).

In other words, this prevents the spring S1 from being compressed beyond a predefined maximum safety value.

It should be noted, however, that the sleeve 12 and the valve body 4 are formed so as to ensure that the closing member 8 may perform a predetermined stroke during normal operation.

In other words, the sleeve 12 and the valve body 4 are formed so as to mate, during forced opening of the closing member, and define both an open position of the said closing member slightly greater than the maximum position which can be reached during normal operation (in the position where the free flow cross-sectional area of the fluid assumes a maximum value) and a maximum compression of the spring S1, where the spring is not yet subject to stresses which may damage it irremediably nor stresses which are greater than those reached during the bedding-in process.

It should be noted, however, that the sleeve and the valve body 4 are formed so as to ensure that the closing member 8 may perform a stroke greater than the maximum stroke possible during operation, ensuring complete opening of the valve.

In other words, this prevents the spring S1 from being compressed beyond a predefined maximum safety value and the valve from opening completely.

In this connection, the fact that the sleeve 12 and the valve body 4 are designed to mate during opening of the closing member 8, avoiding compression of the spring beyond the maximum permissible limit for the functionality and structural integrity thereof, prevents the possibility of compression of the spring S1 beyond a predetermined minimum length Lmin and consequent damage thereto or malfunctions.

In order to explain more fully the above it should be noted that preferably the valve (with particular reference to the valve body and sleeve) is configured as follows (with reference to FIG. 1); the terminal end of the hollow tubular or cylindrical portion 31 of the second element 17 and the end of the bottom hollow tubular or cylindrical portion 37i of the sleeve 12 are formed so as to mate during the stroke or the opening movement of the closing member 8, defining a maximum stroke of the closing member in the opening direction, to which full compression of the spring S1 corresponds.

Below locking of the sleeve 12 to the stem 10 according to the invention will be described in detail.

It should be noted, according to the invention, that the sleeve 12 is irreversibly locked to the stem 10.

The term "irreversible locking" is understood as meaning that said locking is irremovable or permanent.

Moreover, said locking, according to the invention, consists of locking without mechanical threading.

According to the invention, the sleeve 12 is locked to the stem 10 irreversibly in a predetermined longitudinal or axial position of the stem 10 so that the spring S1 exerts a closing force of predefined value on the closing member 8 when the closing member 8 is in the closed position P1, corresponding to a predetermined operating pressure of the valve 1 (pressure difference between the high pressure region and the low pressure region).

Moreover, the predefined assembly position on the apparatus 8 is simultaneously respected.

This operating/activating pressure for opening the valve 1, which depends on the through-flow area of the fluid and the closing force of predetermined value of the spring S1 on the closing member 8, will be referred to below also as "calibration pressure".

It should be noted that the force of predetermined value which the spring S1 exerts on the closing member 8 when the closing member is in the closed position P1 is produced by a prestress of the spring S1.

Preferably locking of the sleeve 12 to the stem 10 of the closing member 8 is performed by means of plastic deformation of the sleeve 12 (previously joined to the stem 10).

Even more preferably, said locking is performed by means of crimping. Preferably, locking of the sleeve 12 to the closing member 8 is performed in two successive steps (thus ensuring greater safety and reliability over time):

i) a first step during which the sleeve 12, keyed onto the stem 10, is deformed plastically in the radial direction (primary locking);
ii) a second step during which the terminal end 51 of the stem 10 is deformed (secondary locking).

It should be noted that, per se, primary locking (i) is already sufficient to ensure locking of the stem 10 with respect to the sleeve 12; secondary locking (ii) is performed in order to increase the reliability of locking of the stem 10 with respect to the sleeve 12.

Primary locking (i) is performed in a predefined region 29 of the stem 1. Preferably, secondary locking (ii) envisages "cupped" deformation of the second end of the stem onto a tapered hole of the sleeve.

According to a preferred mode of implementation of the method for manufacturing the valve it is envisaged determining beforehand the predefined region or zone 29 of the stem 10 on which joining to the sleeve 12 is performed.

In particular, preferably it is envisaged performing machining on the stem 10 in the zone 29 on which joining to the chosen sleeve 12 is performed, in order to prepare this zone 29 for joining.

It is also pointed out that, preferably, the sleeve 12 and/or the stem 10 comprise, in the joining zone 29, radial projections 30 or teeth 30 defining a toothed zone (obtained during the aforementioned machining operation).

Even more preferably, the aforementioned radial projections 30 or teeth 30 are formed on the stem 10.

Preferably said teeth 30 are formed on the component (12 or 10) with greater mechanical hardness, normally the stem 10 for technical reasons (the stem is made of hardened material so as to slide easily inside the associated guide of the valve body 4).

In particular, it should be noted that the teeth 30, owing to the radial compressive action during the step i), plastically deform the component (either the sleeve 12 or the stem 10) of lesser hardness (on which the teeth 30 are not present); in this way, by means of plastic deformation, a splined joint of the male/female type is formed between the components, i.e. sleeve 12 and stem 10.

These projections 30 therefore have the effect of increasing the effectiveness of locking performed by means of plastic deformation of the sleeve 12 with respect to the stem 10 (as well as the friction between the aforementioned components, i.e. sleeve 12 and stem 10, there is also interpenetration between the materials of the said parts 10 and 12).

A further advantage of this type of joint between the components 10 and 12 obtained by forming teeth 30, by means of machining, on the harder component and corresponding recesses, by means of plastic deformation, during joining together of the components 10 and 12, is the elimination of any axial or longitudinal play between the aforementioned components 10 and 12.

Preferably, prior to the aforementioned irreversible locking operation, it is envisaged subjecting the spring S1 to a training cycle, where the spring S1 is subject to a plurality or series of consecutive compressions (preferably between 5 and 10 repetitions or compressions).

It should be noted that, according to the invention, the axial compression X (sag) of the spring S1 and the corresponding calibration force of the spring S1 on the closing member when the latter is in the closed position, are determined by means of direct measurement; these parameters are used to select the sleeve 12.

In this connection, according to another aspect of the invention, the sleeve 12 has dimensions such that—when the sleeve 12 is locked in the predetermined position for assembly (namely in the zone 29 of the stem)—it defines a predetermined axial compression (also called "sag") of the spring S1 and, consequently, a predefined calibration force of the spring S1.

Preferably, it is envisaged measuring the force exerted by the spring S1 on the closing member 8 by means of a dynamometer composed of a load cell with which a position transducer is associated; this dynamometer and position transducer allow, advantageously, direct measurement of the resilient force exerted by the spring S1 on the closing member 8 and the axial compression (sag) of the spring S1.

This reactive force of the spring S1 is directly related to the valve operating/opening pressure (depending on the outflow cross-sectional area).

Figure 8:
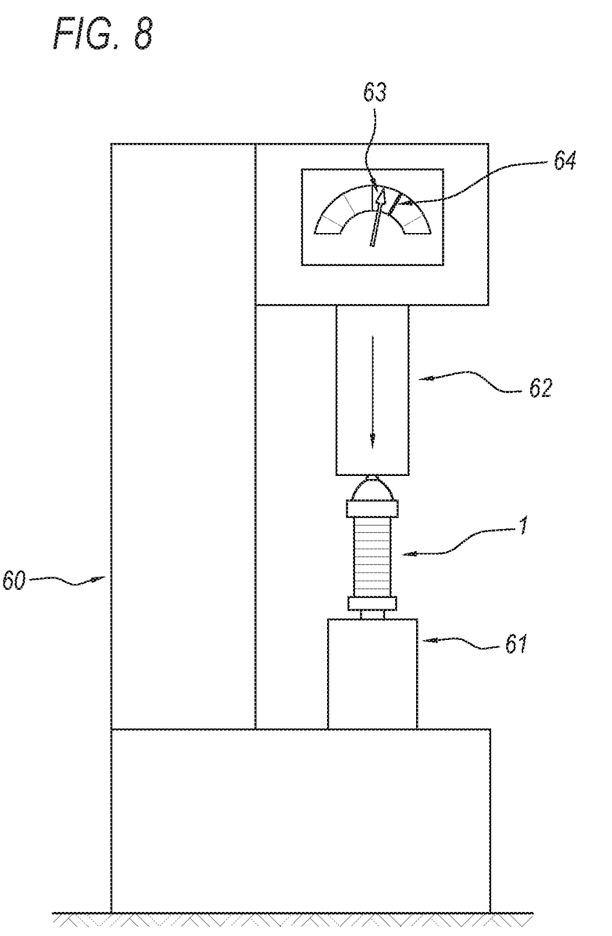
FIG. 8 shows a schematic view of the apparatus for calibrating a valve according to the invention.

Therefore, depending on the desired operating pressure, the sleeve 12 is locked with respect to the stem 10 in a given longitudinal or axial position corresponding to a predefined reaction force of the spring S1 and the position of the components on the assembly apparatus shown in FIG. 8, such as to allow the steps i) and ii), achieved by calculating with a minimum tolerance the axial extension of the sleeve 12.

It should be noted that the reaction force of the spring S1 in the closed position P1 of the closing member 8, preferably, is measured during the return stroke of the closing member 8 (or during movement of the closing member 8 in the closing direction CD).

The calibration/locking operations described above are performed on an apparatus specially designed for this purpose and shown schematically in FIG. 8.

It should be noted that this type of calibration is a calibration performed "off-line", namely performed without the valve 1 having to be installed or tested in a hydraulic circuit (as is performed in the prior art).

The valve 1 is calibrated by means of a calibration apparatus 60 specially designed for this purpose, also forming part of the invention.

This calibration equipment or apparatus comprises a dynamometer for measuring a quantity representing the resilient force of the spring S1.

It should be noted that the dynamometer defines means for measuring the resilient force exerted by the spring S1.

More generally, the dynamometer defines means for detecting a quantity representing a value of a reaction force of the spring S1.

This apparatus also comprises gripping means designed to hold the valve body 4 with respect to the frame of the apparatus (for example a seat for receiving the valve body 4).

The apparatus comprises means 61 for retaining or fixing the closing member in the closed position P1.

The apparatus according to another aspect also comprises means for selecting the sleeves 12, designed to chose and remove from a plurality of sleeves that sleeve which has a geometry such as to allow the predefined reaction force of the spring S1 to be obtained in the locking position assumed on the stem 10 with respect to the head of the closing member 8.

The calibration apparatus also comprises handling means designed to vary the position of the sleeve 12 with respect to the closing member 8, in particular with respect to the stem 10.

Furthermore, preferably the calibration apparatus comprises means for selecting and handling the second part or guide 17 so as to prevent damage to the valve 1 and the spring S1 and ensure that the fully open operating condition may always be reached during operation in the installations.

These handling means allow extremely precise adjustment of the position of the sleeve 12 with respect to the stem 10.

FIG. 8 shows schematically a calibration apparatus 60 according to the invention.

It should be noted that 61 denotes the means for retaining or fixing the closing member 8 in the closed position P1, 62 the sleeve handling means, 63 the means for detecting the reaction force of the spring S1 and 64 the means for detecting the predefined calibration reaction force.

With this apparatus 60 it is possible to perform extremely fast and reliable calibration of the valve 1, without the need for installation of the valve 1. In fact it should be noted that calibration is performed by means of the operations described below.

The assembled valve 1 (namely with the predetermined components correctly assembled together, but not yet locked as per steps i) and ii)) is inserted inside the calibration apparatus so that the valve body 4 is held with respect to the frame.

Similarly the closing member 8 is kept in the closed position by means of the retaining means.

It should be noted that the sleeve 12 is moved so as to compress the spring S1 until the force sensor signals that a predefined reaction force of the spring S1 is reached.

The operator checks that this predefined force of the spring S1 is actually reached with the sleeve 12 arranged in a predefined region of the stem 10, without eliminating the free space between the sleeve 12 and the guide 17; if this has not occurred it is required to fit on the valve 1 a sleeve 12 with a different height HF so that this condition does not occur, and where this should not be sufficient, a second part 17 with a different height HG so that the aforementioned conditions may occur in the assembled unit (or valve).

It should be noted that, according to a preferred embodiment, it is essential that the sleeve 12 should be correctly selected and positioned along the stem 10 so as to allow locking to be performed in accordance with steps i) and ii) described above.

In fact, as already mentioned above, the detection means also comprise a position transducer which is able to indicate the position of the sleeve 12 along the stem 10.

It should be noted that, according to the preferred embodiment, the second part 17 is designed (has dimensions) such as to define a predefined axial extension able to allow (when positioned along the stem 10) the predefined reaction force of the spring S1 to be reached and at the same time prevent elimination of the play, or free space, between the sleeve 12 and the second part 17.

In particular, the predefined axial extension of the second part 17 lies between an upper limit value, chosen to ensure the fully open operating position of the valve, and a lower limit value, for preventing jamming and/or damage to the spring and damage to the valve 1, in particular during testing (e.g. of the locking strength, the calibration force of the spring on the dynamometer, etc.) and assembly on the installations.

The apparatus preferably comprises furthermore means (not shown) for joining the sleeve 12 to the stem 10 so as to form an irreversible joint of the sleeve 12 to the stem 10.

These joining means, preferably but not exclusively, are designed to deform irreversibly (plastically) the sleeve 12 and stably lock, without threading, the sleeve 12 to the stem 10.

According to another aspect, the apparatus comprises a control and operating unit (electronic control unit) connected:

to the detection means 63 for receiving a signal relating to said quantity representing a value of a reaction force of said spring S1 and a signal relating to the axial measurement of the position of the sleeve 12;

to the handling means so as to drive them in such a way as to vary the position of the sleeve 12 along the stem 10 and define the aforementioned position of the sleeve 12 along the stem 10, where a value of said quantity representing a reaction force value of said spring S1 corresponding to a predefined value is detected (and, preferably, check that it is within the set tolerance, i.e. that required for steps i) and ii));

and to the joining (or locking) means so as to activate them in the aforementioned defined position.

Moreover the control unit is connected to the selection means for determining the exact components to be assembled.

According to this aspect, the control and operating unit operates the handling means (displacing the sleeve 12 along the stem 10 with closing member 8 closed) and stops the said handling means when a predefined value of the reaction force of the spring S1 (and the compatibility of the position with steps i) and ii) has been detected; at this value the joining (or locking) means for irreversibly connecting the sleeve 12 to the stem 10 are activated.

Advantageously this allows calibration of the valve 1 to be performed in a completely automatic manner (anti-shock function).

A calibration method comprising the following steps is also defined:

retaining the closing member (8) in the closed position (P1);

detecting a quantity representing a value of a reaction force of said spring (S1);

varying the position of the sleeve (12) along the stem so as to define a position of said sleeve (12) along the stem where the quantity representing the reaction force of the spring (S1) detected has a predefined value (it should be noted that the position of the sleeve is selected so as to be compatible with steps i) and ii) and with the height HG of the guide so as to avoid jamming of the spring and ensure the fully open operating condition;

irreversibly locking the sleeve (12) with respect to the closing member (8) in the defined position.

It should be noted that with the apparatus and the method according to the invention it is possible to calibrate the valve 1 "off the bench" (off-line calibration of the valve) with a considerable saving in terms of time and cost.

It should also be noted that, by means of locking performed according to the methods described above, it is possible to fix together stably over time sleeve 12, closing member 8, spring S1 and valve body 4; this prevents the prestress of the spring S1 from being modified over time as a result of movement of the sleeve 12 away from the valve body 4, preventing any variation in the operating or opening pressure of the valve 1.

The irreversibility and the stability of locking in fact ensure that over time (when the valve is closed) sleeve 12, closing member 8, spring S1 and valve body 4 do not modify their relative position.

In this way the valve 1 is extremely precise and reliable over time, ensuring that the actual operating pressure (at which opening of the closing member 8 occurs) is that desired or actually set during calibration, remaining constant over time or differing minimally from that actually set during calibration (owing to inevitable fatigue of the spring).

The valve 1, therefore, in addition to being able to be manufactured in a relatively simple manner, is calibrated in an extremely precise and rapid manner.

Moreover the aforementioned calibration is reliable over time.

According to yet another aspect of the invention, the valve 1 comprises an additional spring S2 having an anti-cavitation function.

According to this aspect, the valve body 4 is also movable with respect to the walls of the seat 3 between a closed position (shown in FIGS. 1 and 2), where the valve body 4 bears against the walls of the seat 3 (in particular against the walls of the conical sealing surface 13 or the tapered zone 13), and an open position (not shown) where the valve body 4 does not bear against the walls of the seat 3 (in particular against the walls of the conical sealing surface 13) and defines, together with the walls of the seat 3 and the valve body 4, a further fluid through-passage between the low pressure duct LP and the high pressure duct HP.

It should be noted that, in the example shown in FIG. 1, the valve body 4 is movable from the closed position into the open position and vice versa along the direction X in the closing direction CD and opening direction OD opposite to the closing direction OD and opening direction CD of the closing member 8.

Owing to this additional spring S2, inserted into the structure of the valve 1, an anti-cavitation function may be provided in the installation circuit.

In fact, if the pressure of the high pressure circuit HP is less than that of the low pressure circuit LP by a predetermined amount, corresponding to a cavitation condition of the high pressure zone HP or emptying of the high pressure circuit HP, the valve body 4—as a result of the relative pressure drop between the high pressure circuit HP and the low pressure circuit LP—is moved from the closed position into the open position against the action of the additional spring S2; it should be noted that the fact of having two circuits (HP, LP) in fluid communication allows the pressure to be increased in the high-pressure region HP, avoiding cavitation and emptying of this region.

It should be noted also that the fact that the closing member is designed so as to have a fixed predetermined axial length and identical axial position of the zone 29, suitable for locking the sleeve 12 (for all the valves in the same family/category) advantageously results in the radially prominent portion 18, or flange, of the sleeve 12 having a predetermined axial extension which is fixed for each category of valves; this advantageously means selecting the axial extension of the sleeve so as to ensure that the spring S1 is compressed at the load corresponding to the calibration pressure (or operating pressure) and that, at the same time, its upper face is located at a constant predetermined axial distance compatible with the anti-cavitation function requirements, in accordance with that described above regarding step ii).

It should be noted furthermore that when the valve and the associated cap are mounted in their seat/cavity the anti-cavitation spring S2 is compressed always to the same working length LM equal to the distance between the upper face of the flange 18 and bottom wall of the cap 23 (the spring S2 is operationally arranged between said upper face of the flange 18 and said bottom wall).

Therefore it is possible to provide the spring S2 with dimensions so as to have a predetermined (desired) prestress depending on the abovementioned working length LM.

It should be noted that the working length LM of the (additional) spring S2, operationally, is determined by the dimensions indicated in the figures by the references D1, D2 and D3.

The dimension D1 is defined by the axial distance between the inner (or bottom) wall 43 of the cap 23 and the flange 40 for mating with the seat 3 of the valve 1 (or the flange which axially bears against the mouth of the seat 3).

La dimension D2 is defined by the axial distance between the locating surface 41 (defined by the seat 3 so as to act as an axial contact surface for the flange 40 of the cap 23) and the bearing point 42 of the valve body 4 inside the seat 3.

This dimension D2, for each valve category, has a constant (standardized) value.

The dimension D3 is defined by the axial distance between the upper wall 44 of the sleeve 12 and the bearing point 42 of the valve body 4 in the seat 3.

In the valve 1 according to the invention this dimension D3 is kept constant for each category of valves.

It should be noted that the fact of keeping these dimensions D1, D2 and D3 constant for the valves of a same category is able to ensure a constant (and predetermined) length LM: in this way it is not required to calibrate further the spring S2 following calibration of the spring S1.

Therefore, knowing the working length LM, it is possible to select (or define the dimensions) of the spring S2 so as to obtain a predefined compression corresponding to a desired prestress (without the need for adjustment of the additional spring S2 during testing/installation).

It should be noted that these dimensions D1, D2 and D3 are specifically determined by the following parameters:
- said zone for locking the sleeve 12 along the stem 10;
- axial extension (or thickness) of the flange 18 of the sleeve 12;
- configuration of the top portion of the cap 23, defining the distance between the inner wall 43 (of the cap 23 and the flange 40 for mating with the seat 3 of the valve 1;
- the length of the closing member 10.

Said axial extension of the flange 18 of the sleeve 12 is selected so that the spring S1 has the predefined length and, at the same time, the zone for locking the sleeve 12 along the stem 10 is a predefined zone (fixed for all valves).

This involves, according to the invention, the advantages which are described below.

Firstly it is possible (and particularly easy) to prepare the stem 10 for connection to the sleeve 12 by means of a suitable configuration of this zone, resulting in a particular reliable connection.

Moreover, the length of the additional spring S2 is always constant for all the valves in the same category, the configuration of the cap 23 (as described above) remaining the same; this results in automatic calibration of the additional spring S2 when the sleeve 12 is locked on the stem 10. This has the advantage that calibration of the anti-cavitation function is obtained already during (and as a result) of fixing of the sleeve 12 to the closing member 8, without having to perform further operations in order to perform said calibration of the spring S2 (the dimensions of the spring S2 are defined depending on the desired prestress at the length LM).

In this connection it should be noted that, in the prior art, it is required to arrange thicknesses in the region of the valve cap, after the sleeve 12 has been screwed in the correct longitudinal position (which is not known beforehand and is known only after calibration).

Alternatively, in the prior art, it is required to modify the geometrical form of the sleeve and/or the characteristic features of the spring following calibration of the spring S1; the first of these solutions requires connection of a new sleeve (with the correct geometrical form) to the closing member and repetition of the operation for calibration of the spring S1.

Therefore, in the prior art, it is required to perform a step involving specific adjustment/calibration of the anti-cavitation spring in order to set this spring to a desired compression (or a step where the length of the spring S2 is adjusted with the valve body sealingly engaged on the associated seat).

Moreover the following comments are made regarding the advantages arising from the fact that the valve body 4 is made as two parts, i.e. the first part 16 (or hydraulic sealing part 16) and the second part 17 (or part for guiding the closing member 8 and spring S1).

In the prior art the limiting valves are designed according to categories based on the maximum flowrate of the fluid to be processed.

Moreover, within each category, the limiting valves are designed based on the maximum operating pressures.

The maximum flowrate influences directly the dimensions of the valve 1 and therefore its components.

The maximum operating pressures influence directly the "population" number of the valves produced, this being understood as meaning the number of valves in a category or size, and moreover influence the spring S1, certain geometrical aspects of the valve body and the closing member and, indirectly, the other components.

According to the invention, the fact of having a limited series of parts 16 and 17 characterized by suitable geometrical variations means that, within each category, a wide range of valves with operating pressures corresponding to the various user requirements may be manufactured.

Moreover, with a limited number of categories (each with a suitable population number) the market demand may be satisfied.

The advantages in terms of ease of management of the restocking and warehouse logistics both for the producer and for the end user are obvious.

Furthermore, owing to the fact that there are two parts (16, 17) which can be joined together—with the seat 3 and the first part 16 designed according to the maximum flowrate, while the dimensions of the second part 17 (or guide for the closing member and spring S1) are defined depending on the aforementioned spring S1 and closing member—the warehouse/management costs may be reduced and a wide variety of valves may be manufactured using a limited number of first and second parts.

It should be noted that the height (HF) between the surface of the flange 18 of the sleeve 12 against which the spring S1 bears and the terminal end of the said sleeve 12 in the direction (X) of extension of the stem is preferably determined depending on the length or the compression length (sag) of the spring S1 at the predefined reaction force; as a result, irrespective of the spring S1 and the operating pressures of the valve 1 (envisaged with this spring S1), the stem 10 can be connected irreversibly to the sleeve 12 in the region 29 which is predefined (namely determined during the design stage).

It should be noted that, since the valve 1 does not have threads, namely is threadless, the valve 1 may be easily manufactured at an extremely low cost and at the same time it is ensured that the calibration conditions are maintained over time.

In fact the threadless connection advantageously does not tend to slacken over time and the prestress of the spring S1 is thus not modified in any way.

In particular, in the embodiment where mechanical deformation is preferably used, the connection is particularly stable over time.

Instead of plastic deformation the sleeve 12 could also be welded to the stem 10 or also locked to the stem 10 by means of half-cones, welding, etc.

In any case, it should be noted that according to the invention the valve 1 is threadless.

Advantageously, the valve according to the invention achieves, for the same dimensions/size, a particularly good performance in terms of maximum managed flowrate as well as a precise and constant calibration pressure (since it ensures relatively small deviations from the theoretical value).

The invention claimed is:

1. A pressure limiting valve, suitable for being inserted in a seat of a hydraulic circuit, the seat having walls and being arranged between a high pressure zone and a low pressure zone, said valve comprising:
   a valve body designed to engage sealingly with the walls of said seat and defining internally a passage for a fluid;
   a closing member having a stem and a closing head connected to a first end of the stem and movably engaged with the valve body so as to move along a longitudinal direction of extension of the stem from a closed position of the passage, where the head is sealingly engaged with the valve body, into an open position of the passage and vice versa, in an opening direction and closing direction, respectively;
   a sleeve, joined to said stem of the closing member at a second end thereof;
   a spring arranged between the sleeve and the valve body and designed to exert a force on said closing member along said longitudinal direction in the closing direction,
   wherein said sleeve is irreversibly locked to said stem through a mechanical coupling which consists of a threadless mechanical connection, in a region of the sleeve located at a predefined longitudinal position of the said stem, so that the spring exerts on the closing member a force of predefined value when the closing member is in the closed position, whereby the mechanical coupling between the sleeve and the stem is threadless;
   a cap configured to be fitted in the seat for closing the seat, and surrounding the sleeve, wherein the sleeve is axially movable with respect to the cap,
   wherein the sleeve has a first end, facing the valve body, and a second end, opposite the first end and surrounded by the cap, and further includes:
   an annular projection extending radially with respect to the longitudinal direction and having a lateral surface facing the cap and a radial outer surface in contact with the cap, wherein the sleeve has a first diameter at the annular projection;
   the region where the sleeve is irreversibly locked to the stem through the threadless mechanical connection is between the annular projection and the second end of the sleeve, wherein the sleeve has a second diameter at said region, which is smaller than the first diameter, and is threadless, wherein the sleeve consists of one single element that provides said region, said second end, and the annular projection.

2. The valve according to claim 1, wherein said mechanical connection between the sleeve and the stem is a connection performed by means of plastic-type deformation.

3. The valve according to claim 1, wherein the valve body comprises a first part, which can be sealingly engaged with the seat, and a second part defining a guide for the stem, said first part and second part being able to be engaged and disengaged with/from each other.

4. The valve according to claim 1, wherein the sleeve and the valve body extend along the longitudinal direction so as to mate when the closing member is in the open position in order to limit the maximum compression of the spring to a predefined value.

5. The valve according to claim 1, wherein the sleeve is locked to the stem in a first region along a side surface of the stem, and in a second region at the terminal end of the stem.

6. The valve according to claim 1, wherein the head of the closing member is arranged on the outside of the valve body.

7. The valve according to claim 1, wherein the valve body is movable with respect to the walls of said seat so as to define a further passage for the fluid, said valve comprising an additional spring with an anti-cavitation function, arranged between the sleeve and an inner wall of a cap for closing the seat and designed to exert on the sleeve a force along said longitudinal direction, in the closing direction of the valve body, and wherein an axial extension of the sleeve is selected so that the distance between a top wall of the sleeve and said inner wall of the cap is such as to produce a predefined compression of the additional spring for the anti-cavitation function, the sleeve being fixed to the stem in said predefined longitudinal position and said cap defining a predefined fixed longitudinal extension with respect to a zone for mating between the cap and the seat.

8. The valve according to claim 1, wherein said annular projection of the sleeve has an upper surface and a lower surface, wherein said spring arranged between the sleeve and the valve body abuts against said lower surface of the annular projection of the sleeve.

9. The valve according to claim 1, wherein said annular projection of the sleeve has an upper surface and a lower surface, and wherein the valve comprises an additional spring with an anti-cavitation function, arranged between the sleeve and an inner wall of the cap, said additional spring abutting against said upper surface of the annular projection of the sleeve.

10. The valve according to claim 1, wherein said stem or said sleeve defines a first locking part which comprises a joining portion provided with grooves designed to deform plastically a corresponding portion of a second locking part, thus allowing the aforementioned irreversible locking together of said sleeve and said stem, the second locking part being the other of said stem and said sleeve.

11. The valve according to claim 10, wherein the first locking part has greater mechanical hardness than the second locking part.

12. A method for manufacturing a pressure limiting valve, comprising the following steps:
providing a valve body defining internally a passage for a fluid and designed to engage sealingly with a seat of a hydraulic circuit arranged between a high pressure zone and a low pressure zone;
providing a closing member comprising a stem and a closing head connected to a first end of the stem;
joining the closing member to the valve body so that the closing member is movable along a longitudinal or axial direction of extension of the stem from a position for closing the passage, where the head is sealingly engaged with the valve body, into a position for opening the passage, and vice versa, in an opening direction and closing direction, respectively;
providing a sleeve and a spring arranged between the sleeve and the valve body so that said spring exerts a force on said closing member along said longitudinal or axial direction, in the closing direction, wherein the sleeve has a first end, facing the valve body, and a second end, opposite the first end and surrounded by the cap, and has an annular projection, extending radially with respect to the longitudinal direction, and wherein the sleeve is axially movable with respect to a cap surrounding the sleeve and fitted in the seat, with a lateral surface of said annular projection of the sleeve facing the cap, wherein the annular projection has a radial outer surface in contact with the cap;
joining the sleeve to the stem of the closing member at a second end thereof, in a region of the sleeve located between the annular projection and the second end, wherein the sleeve has a first diameter at the annular projection and a second diameter, smaller than the first diameter, at said region;
compressing the spring between the sleeve and the valve body to a compression corresponding to a predefined force value,
wherein said joining of said region of the sleeve to the stem is performed at the region of the sleeve located between the annular projection and the second end, through a mechanical coupling which consists of a threadless mechanical connection, in a longitudinal position of the stem corresponding to said compression, whereby the mechanical coupling between the sleeve and the stem is threadless, wherein the sleeve consists of one single element that provides said region, said second end, and the annular projection.

13. The method according to claim 12, comprising, prior to said irreversible locking step, a step involving machining of said stem along a predefined zone for joining said stem to said sleeve so as to form grooves in said joining zone.

14. The method according to claim 12, wherein said locking step is performed by means of crimping.

15. The method according to claim 12, wherein said locking step comprises a step involving plastic deformation of the sleeve in a radial direction perpendicular to said direction.

16. The method according to claim 12, wherein said locking step comprises a step involving plastic deformation of a terminal portion of the stem.

* * * * *